US011169971B2

(12) United States Patent
Camping et al.

(10) Patent No.: US 11,169,971 B2
(45) Date of Patent: *Nov. 9, 2021

(54) ELECTRONIC FILE TRANSFER AND MODIFICATION SYSTEM AND METHOD

(71) Applicant: Omniquity, Inc., New River, AZ (US)

(72) Inventors: Brandon Camping, Glendale, AZ (US); Rob Laizure, Sr., Surprise, AZ (US); Rob Laizure, Jr., Surprise, AZ (US); Vann Gutierrez, Phoenix, AZ (US)

(*) Notice: Subject to any disclaimer, the term of this patent is extended or adjusted under 35 U.S.C. 154(b) by 104 days.

This patent is subject to a terminal disclaimer.

(21) Appl. No.: 16/720,564

(22) Filed: Dec. 19, 2019

(65) Prior Publication Data
US 2020/0125539 A1     Apr. 23, 2020

Related U.S. Application Data

(63) Continuation of application No. 15/144,606, filed on May 2, 2016, now Pat. No. 10,628,390.

(60) Provisional application No. 62/155,399, filed on Apr. 30, 2015.

(51) Int. Cl.
| G06F 16/182 | (2019.01) |
| G06F 16/16 | (2019.01) |
| G06F 16/70 | (2019.01) |
| G06F 16/40 | (2019.01) |
| H04L 29/08 | (2006.01) |
| G06F 16/11 | (2019.01) |

(52) U.S. Cl.
CPC ........ *G06F 16/1837* (2019.01); *G06F 16/113* (2019.01); *G06F 16/164* (2019.01); *G06F 16/40* (2019.01); *G06F 16/70* (2019.01); *H04L 67/06* (2013.01)

(58) Field of Classification Search
CPC .. G06F 16/113; G06F 16/1837; G06F 16/164; G06F 16/40; G06F 16/70; H04L 67/06
USPC ........................................................ 707/771
See application file for complete search history.

(56) References Cited

U.S. PATENT DOCUMENTS

| 6,868,424 | B2* | 3/2005 | Jones | G06F 16/93 707/822 |
| 7,107,538 | B1* | 9/2006 | Hinckley | G06F 21/62 707/999.01 |
| 7,703,012 | B2* | 4/2010 | Park | G06F 16/4387 715/249 |
| 8,296,312 | B1* | 10/2012 | Leung | G06F 16/152 707/760 |
| 8,471,925 | B2* | 6/2013 | Chu | G06F 16/51 707/822 |
| 8,589,343 | B2* | 11/2013 | Solin | G06F 16/1734 707/615 |
| 2007/0027910 | A1* | 2/2007 | Buss | G06F 21/62 |
| 2010/0185776 | A1* | 7/2010 | Hosur | G06F 16/258 709/231 |

(Continued)

*Primary Examiner* — Shahid A Alam (57) ABSTRACT

Systems and method of the present invention are directed to data transfer systems and methods. Embodiments enable a user to access an electronic file to ascertain certain attribute data associated with one or more files, and allow the user to modify certain elements of the subject attributes file during the course of transferring the one or more files from a source location to a target or destination location.

1 Claim, 7 Drawing Sheets

(56) References Cited

U.S. PATENT DOCUMENTS

2013/0227285 A1\* 8/2013 Bracher .............. G06F 21/6218
713/168

\* cited by examiner

ELECTRONIC FILE TRANSFER AND MODIFICATION SYSTEM AND METHOD

PRIORITY

This application is a continuation of U.S. Non-Provisional patent application Ser. No. 15/144,606 entitled "Electronic File Transfer and Modification System and Method" filed on May 2, 2016, which claims priority from U.S. Provisional Patent Application No. 62/155,399, filed Apr. 30, 2015, which is incorporated fully herein by reference in its entirety.

TECHNICAL FIELD

The present invention relates generally to systems, methods, and computer programs for enhancing data upload and download services and, more particularly, to facilitating and controlling the modification of file data during the transfer of one or more subject files to a known destination such as a cloud service, a file server, a computer file operating system, mobile device, and the like.

BACKGROUND OF THE INVENTION

Current services adapted to provide uploading of data or source files or large groups of files (e.g., Dropbox™, SugarSync™, Box™, OneDrive™, etc.), are greatly limited in the way the user can edit or modify various file data—such as file names, authorship, dates, and other like metadata and file attributes. For example, users will typically send one or more files for upload from a device (e.g., via a web browser). Once the files are uploaded, then and only then, can the file attributes be edited and modified to differ from the original data status present at the time of the upload. Code exists on the server that processes the changes, and then updates the file information at the client interface. As such, the users are undesirably required to wait until the full upload process is complete before the changes can be made, and before receiving any confirmation of the implemented file data changes. In addition, users cannot delete the files until the file transfer completes.

Accordingly, there exists a need for new, improved, and more efficient systems and methods for allowing users to access, edit, and delete file attributes for uploaded files.

SUMMARY OF THE INVENTION

Particular embodiments of the present invention are directed to data transfer systems and methods, including permitting a user to access one or more electronic data or source files to ascertain certain data associated with the one or more data files, and allowing the user to modify certain elements or attributes of the subject data files during the course of transferring the one or more data files from a source location to a target or destination location. One or more Data Transformation Files ("DTFs") can include a plurality of Data Processing Definitions ("DPDs"), including which attributes of the data file can be changed, acceptable changes and values, whether or not multiple values can be changed, interrelations between attributes of the data file, maximum and minimum ranges or values for the attributes, and generally any data pertinent to modifying the source data file. Other processing definitions can be employed as well without deviating from the spirit and scope of the present invention.

Embodiments of the present invention facilitate consuming and processing of the DTFs using the system software's proprietary Data Processing and Transformation Engine ("DTEngine"). The DTEngine implements a specification for instructions to read, display, process, and edit the various DPDs within the DTFs. This permits a third party or user the ability to add DPDs to DTFs, or modify DPDs, in order to flexibly and efficiently process a specific file extension.

Embodiments of the present invention facilitate transferring (e.g., uploading) of the source file from the source location to the destination location while simultaneously allowing elements within the source file to be modified using a temporary data cache to hold the changed, deleted, or added values. Upon receipt of the file at its target location, the data in the cache is written to the source file, and the file is stored to include the new data values, or the file is deleted if the user entered such instructions via the DTEngine.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and to enable a person skilled in the pertinent art to make and use the embodiments disclosed herein. In the drawings, like reference numbers indicate identical or functionally similar elements.

DETAILED DESCRIPTION

Referring generally to FIGS. 1-7, exemplary methods, and computer programs, or software application systems 100, are provided for interacting with and modifying data attributes of a file during the process of transferring or uploading the file to a target location. Namely, one or more source data files are copied from a specific and known location to a specific and known destination, while allowing the user or operator to modify, delete, or add certain data to one or more of the source data files.

Figure 1:
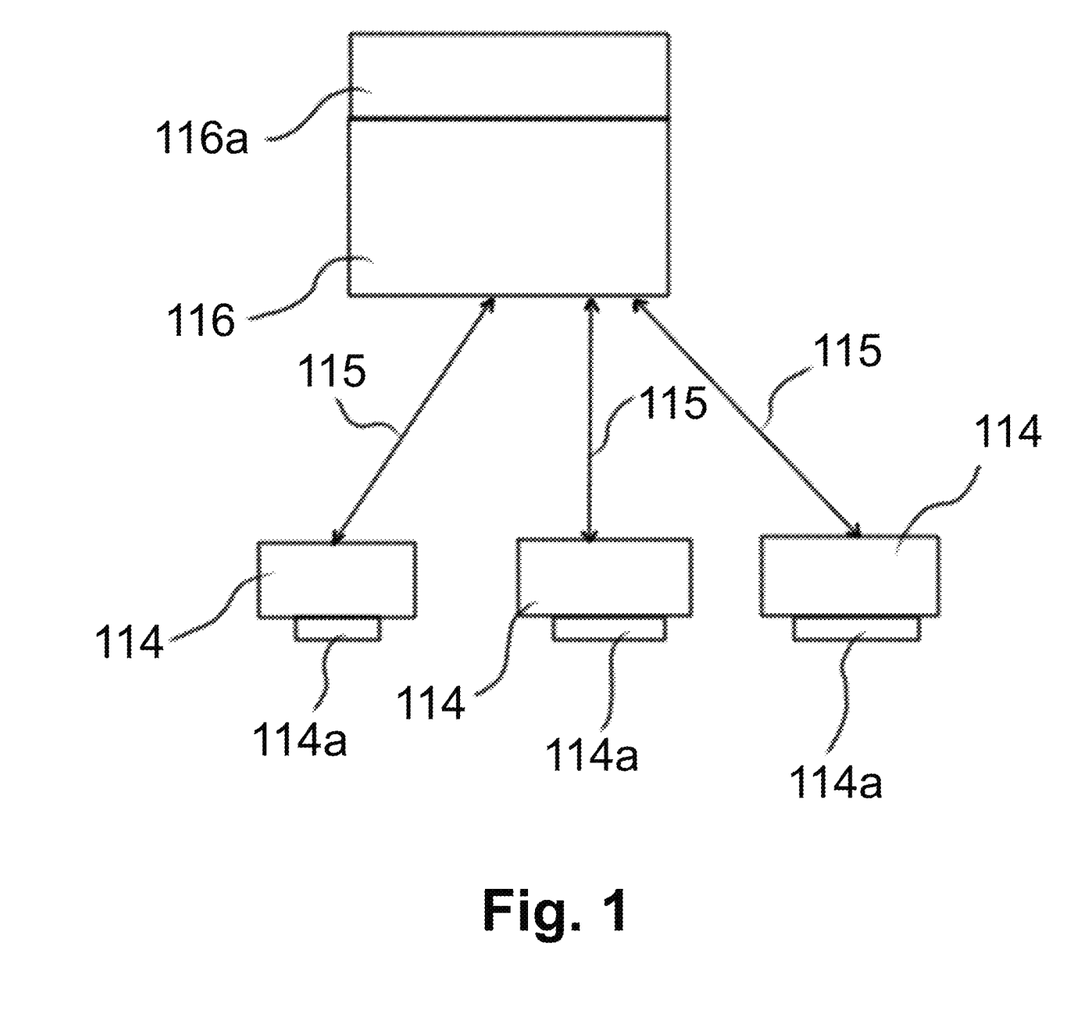
FIG. 1 shows a system having a plurality of user computing devices and at least one server interconnected by a network, in accordance with various embodiments of the present invention.

FIG. 1 illustrates an exemplary hardware architecture for aspects of the present invention. As detailed herein, one or more user computing devices 114 are capable of loading, processing, and writing to data on storage or memory 114*a*. Likewise, one or more servers or remote computing devices 116 are capable of receiving, processing, and writing to data on storage or memory 116*a*. A network communication 115 (e.g., the Internet) is provided to facilitate data and file transfers.

Referring to FIG. 2, again for purposes of understanding and illustrating the system 100 of the present invention, "Data Transformation Files" or "DTFs" 130 can include a plurality of "Data Processing Definitions" or "DPDs" 132. The DPDs include which attributes of the data file can be changed, deleted, or added, acceptable changes and values, whether or not one or multiple values can be changed, interrelations between source file attributes, minimum and maximum range values, and generally any data pertinent to modifying the source data file. A proprietary software "Data Processing and Transformation Engine" or "DTEngine" 140 executes a specification of instructions to read, display, process, and edit the various DPDs 132 within the DTFs 130 for eventual writing to the source data file at the destination location.

Figure 2:
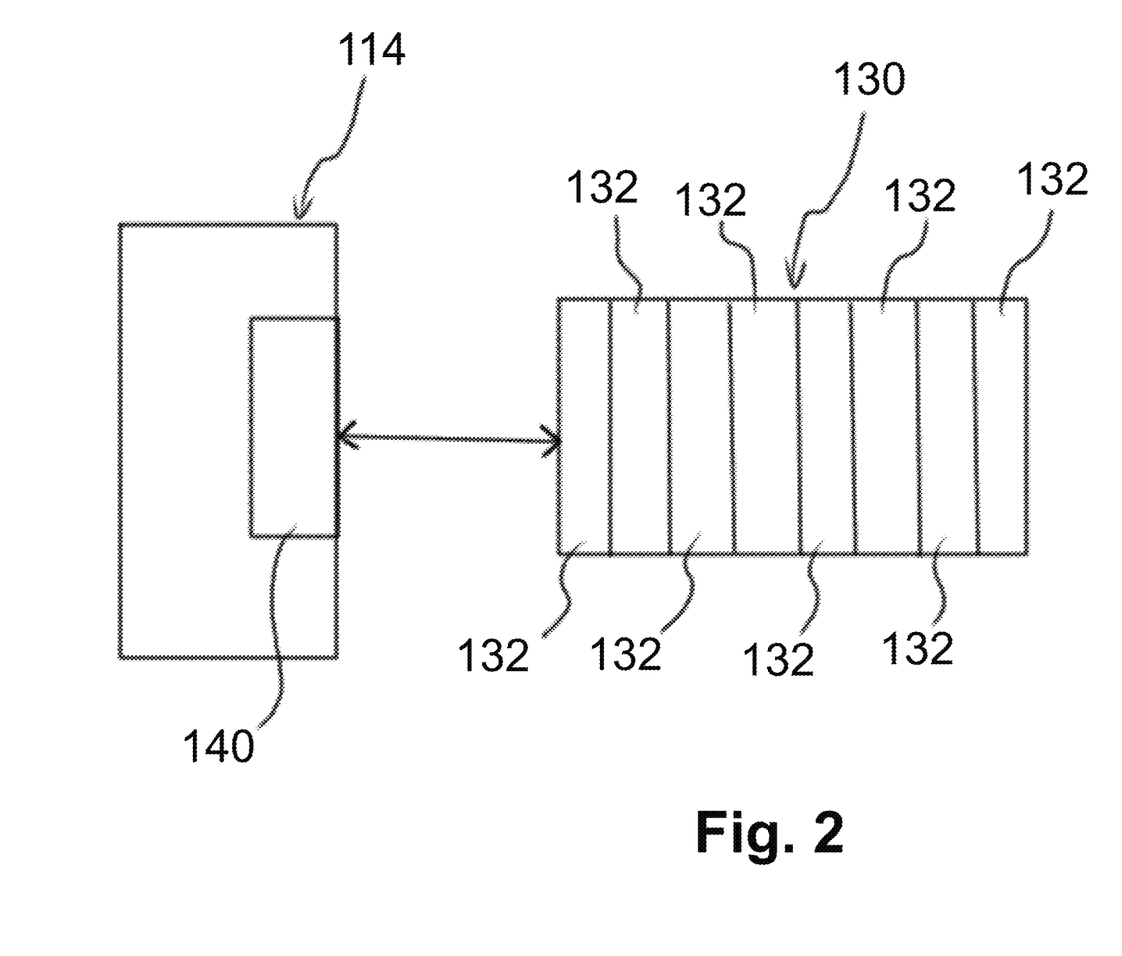
FIG. 2 shows processing access of a user computing device and a data transformation engine with one or more data transformation files, in accordance with embodiments of the present invention.

In general, the system or service 100 can query and process informational files (e.g., DTFs 130) to ascertain instructions on how to process the source files—e.g., based on file type extensions. Upon determining the respective instructions, the system 100 causes one or more source files to begin transferring (e.g., uploading) from a resting source location (e.g., at device 114) to a destination location (e.g., at server 116). The operator or user of the system 100 can be prompted to change modifiable attributes of the source files pursuant to the instructions found in the informational files. The operator or user may change any modifiable data fields, and will not be permitted to modify any data fields which are not modifiable or flagged as unmodifiable. Once the user has confirmed completion of the file modification task via the DTEngine 140, the system 100 causes the ultimate destination files to include the unchanged fields, as well as the data modified by the end user or operator, in the transferred data source files at location 116.

Figure 3:
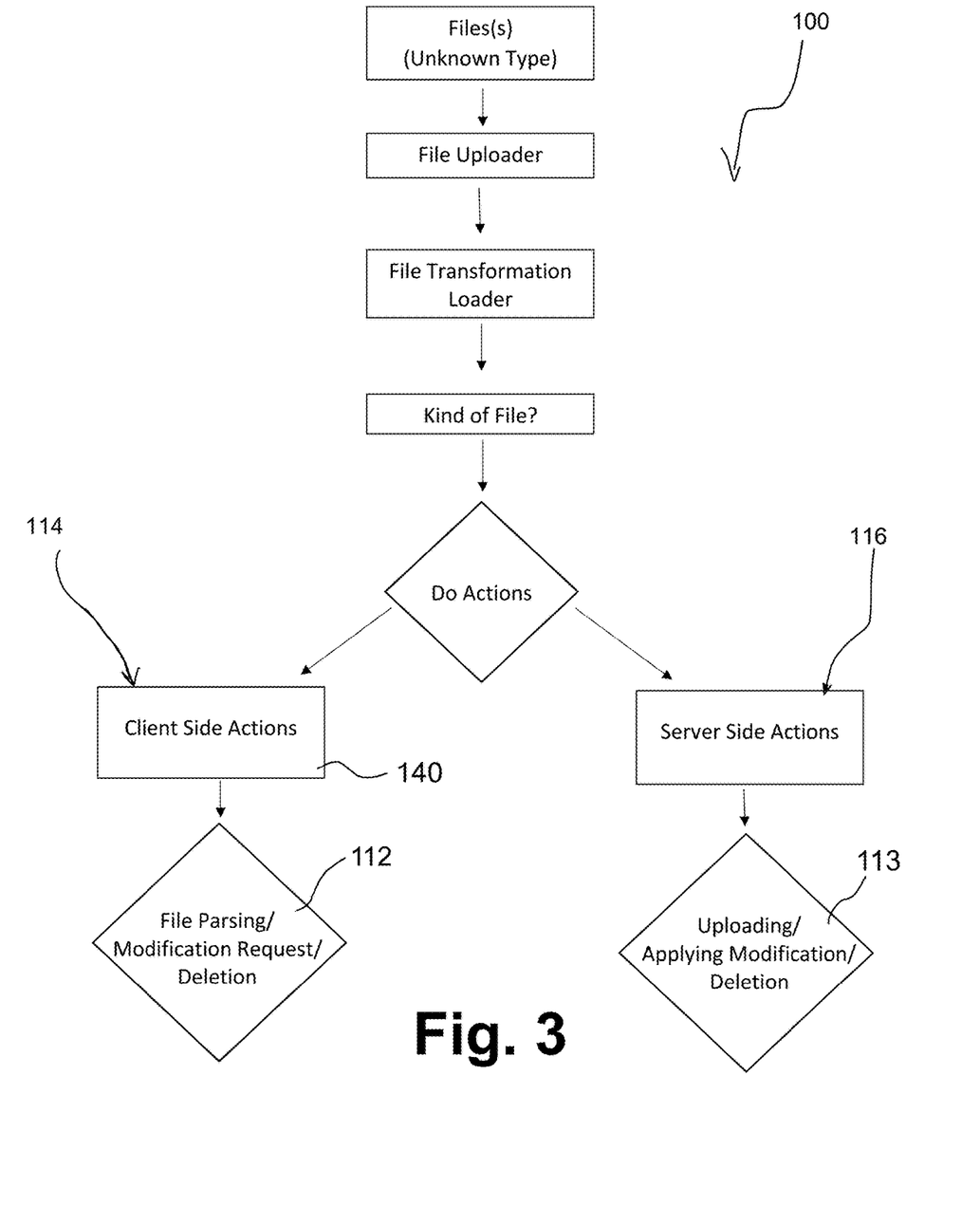
FIG. 3 shows a step flow chart of client-side and server-side actions, in accordance with embodiments of the present invention.

As shown in FIG. 3, the software or service 100 is configured to process one or more files from an upload form component, and perform a custom set of actions on those files based on a file's designated attributes. Custom functions can be defined and executed on a client-side device (e.g., user device 114), thus allowing for interaction 112 with a source file's original attributes (e.g., via DTEngine 140) before a given file is fully uploaded to a target endpoint (e.g., server 116). For example, in certain embodiments, the client-side device 114 can display the DPD fields of the source file received from the informational DTF files by the system 100 for modification or editing by the user. The processing and modifications of the DPD attributes by the DTEngine can take place in a cached file or memory/storage (e.g., temporary) to free the original source file for uploading. The server 116, at the time the user is modifying the data fields, can begin receiving the actual source file during an uploading process to the target location at step 113. The modified data fields are later written or updated to the uploaded source file at the destination location—depending on the user actions and modification performed at the DTEngine 140 at the client-side processing step 112.

The user interface for selection of the source file, or batch of source files, for uploading can include an output display and their file path on the computing device 114. The user can select, via clicking, pointer selection, dragging and dropping, or other known methods and techniques for file selection and transfers/moving. The user can then select a source file by known methods and techniques to display and process the subject file for modification by the user via the DTEngine.

Various devices or computing systems can be included and adapted to process and carry out the aspects, computations, and algorithmic processing of the software system 100 of the present invention. Computing systems and devices of the present invention may include a processor, which may include one or more microprocessors and/or one or more circuits, such as an application specific integrated circuit (ASIC), field-programmable gate arrays (FPGAs), etc. Further, the devices can include a network interface 115. The network interface 115 is configured to enable communication with a communication network (e.g., the Internet), other devices and systems, and servers, using a wired and/or wireless connection.

The devices or computing systems may include memory, such as non-transitive memory, which may include one or more non-volatile storage devices and/or one or more volatile storage devices (e.g., random access memory (RAM)). In instances where the devices include a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices 114 may include an input device. The input device is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output device can be configured to display images, media files, text, or video, or play audio to a user through speaker output.

Server processing systems for use or connected with the system 100 of the present invention, can include one or more microprocessors, and/or one or more circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to magnetic media (e.g., a hard disk), optical media (e.g., a DVD), memory devices, etc.

The present invention can be embodied as software code residing on a user's computing device (e.g., desktop, tablet, mobile, and the like). This can be the same computing device 114 from where the uploaded files originate. The user's computing device is networked or connected with a remote computing system or server 116 (e.g. via the Internet 115) that is the destination where the uploaded file is being sent for storage and file attribute modification. The target destination can be a storage area network (SAN), a data cloud, or any computing device for storing the file or files being uploaded.

The software code of the invention can take the form of a plugin or app, and can interface with various file transfer protocols using APIs or other means to interact with transfer protocol systems and destination computing systems. The software code can be referred to as the "data definition" or DPD plugin, application, or app throughout this disclosure.

Figure 4:
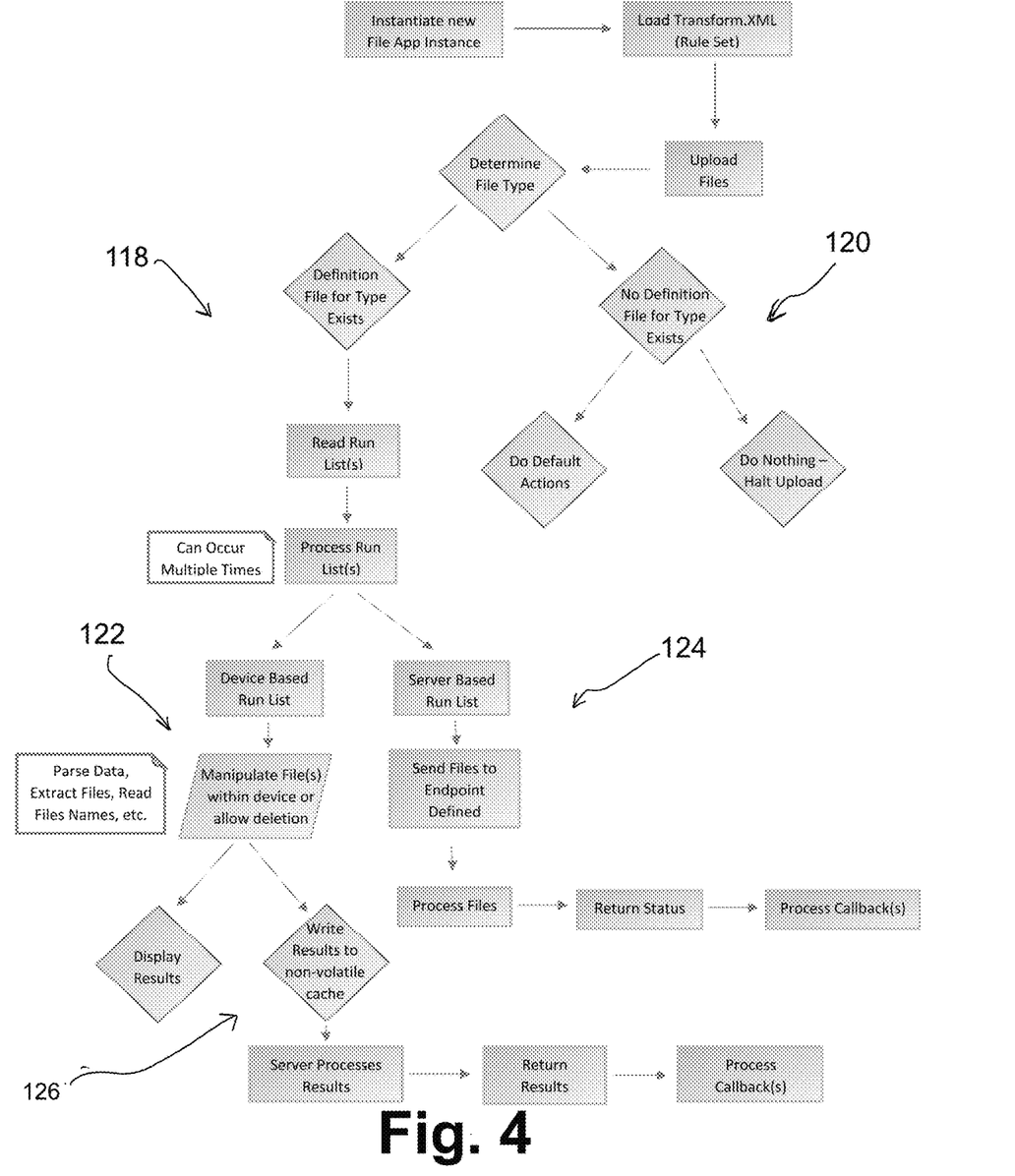
FIG. 4 shows process steps for a data transformation engine and data transformation files across client-side and server-side actions, in accordance with embodiments of the present invention.

Referring generally to FIG. 4, to achieve the desired functionality, the software application is built with an extensible architecture. The DTFs (e.g., external or internal to the software) are read and processed. Within the DTFs, multiple DPDs that describe the actions for a given file type are received and processed by the DTEngine within the core application. Nearly any file type, and any attributes for a given file type, can be loaded, displayed, processed, and modified by the user through the DTEngine. In certain embodiments, the file types (with file extensions) being modified and transferred can include media files—e.g., .AVI, .MOV, .MP4, .JPEG, .GIF, .MP3, .WMA, .PNG, and a myriad of other file extensions and types. In addition, .PDF, .DOC, .DIF, .EPS, .XML, 0.3DS, .DB, .DXF, and other known file types and extensions can likewise be processed by the DTEngine 140 as described herein.

The DTEngine 140 reads and processes properly formed DPDs to allow for the defining of a set of actions to be performed on any file type. If a DPD segment does not exist for a given file type, a default set of rules will be executed—step 120. Within a DPD segment, multiple sets of rules and instructions can exist to allow for multiple iterations of processing within a device and endpoints.

A plurality of DPDs can be created, read, and processed at step 118, including which elements of the data file can be changed, acceptable changes and values, whether or not multiple values can be changed, interrelations between one element of the data file and another element of the data file, maximum ranges or values, minimum ranges or values, and generally any data pertinent to modifying the source data file. Other processing definitions can be employed as well without deviating from the spirit and scope of the present invention.

By using the software of the present invention 100, subject files appear to be intercepted within the code being executed on the device as the subject files are being sent to a server side destination. Data is extracted from the files and displayed at the client device (e.g., browser, mobile app, desktop app, etc.) via the DTEngine, providing expedited input from and feedback to a user while the files are being uploaded and processed.

Referring to step 122, the DTEngine software 140 will display the data as contained and described in the DPDs. For example, a DPD segment may instruct the software to display certain data and not allow modification of such data. The DPDs may also instruct the application to only allow certain data to be modified by selecting valid values or value ranges from a dropdown list control or like user interface. Additionally, the DPD can instruct the application to change related data values (or disallow the modification of certain related data values) upon the change of another related data value.

The modified attributes of the single file or a multiple-file batch created by the user are cached at step 126 (e.g., memory, storage, etc.), while the upload process continues at step 124. Once the upload to the target destination is complete, the software automatically updates the attributes for the source data file now resident on the destination computing system 116 based on the data from the cached attributes. Thus, the user does not need to wait for the upload to complete before the attributes are altered on his or her end.

Ultimately, the DTEngine and the DTFs work as a paired combination to facilitate and advance the functionality of the present invention. The DTFs contain the instruction set or rule set necessary to process the subject files. The DTEngine reads and validates the DPDs within the DTFs and instructs the application of what should occur or change with the subject source files based on the modified DPDs.

Figure 5:
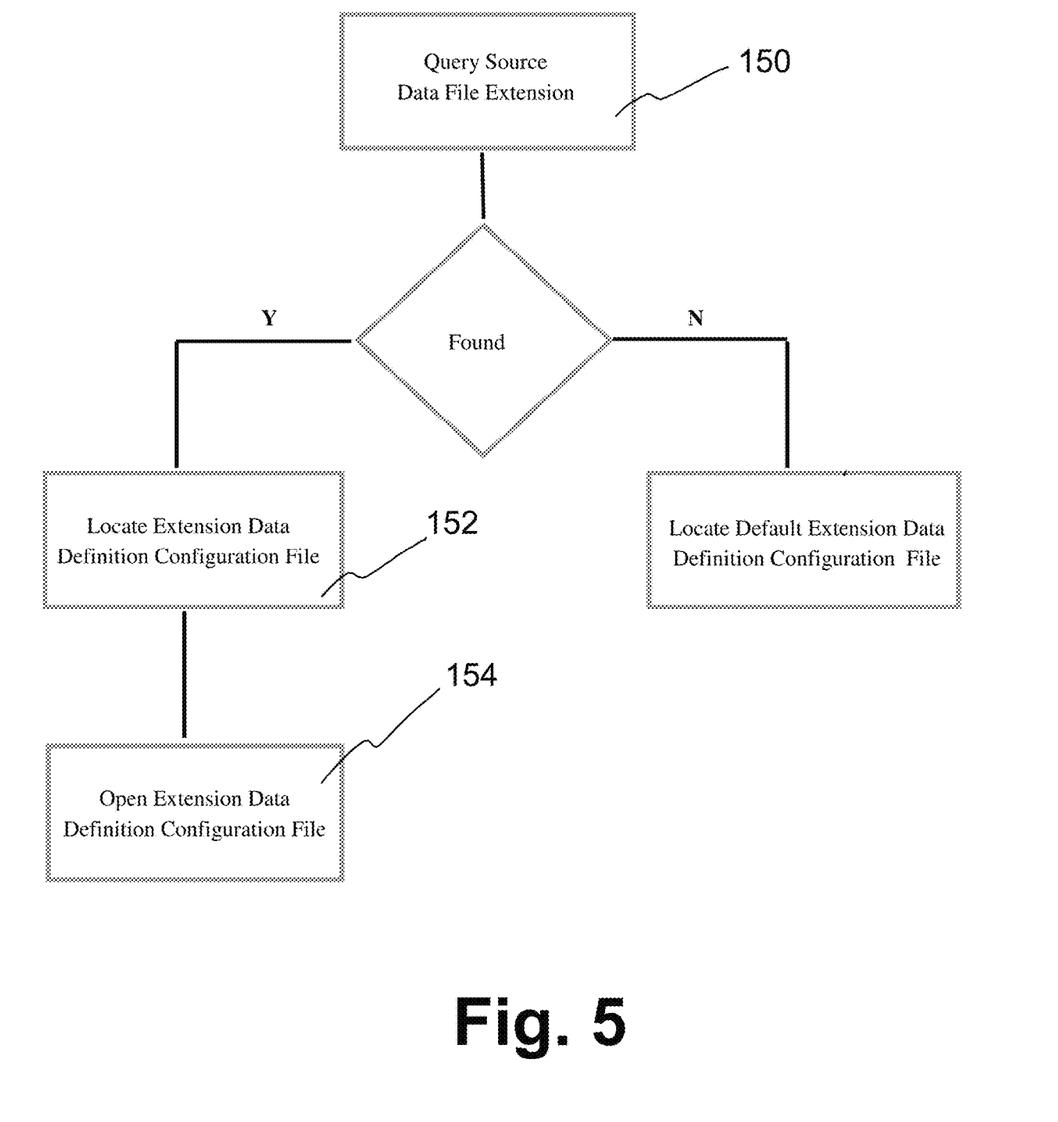
FIG. 5 shows process steps of querying and opening a data transformation or configuration file, in accordance with embodiments of the present invention.
Figure 6:
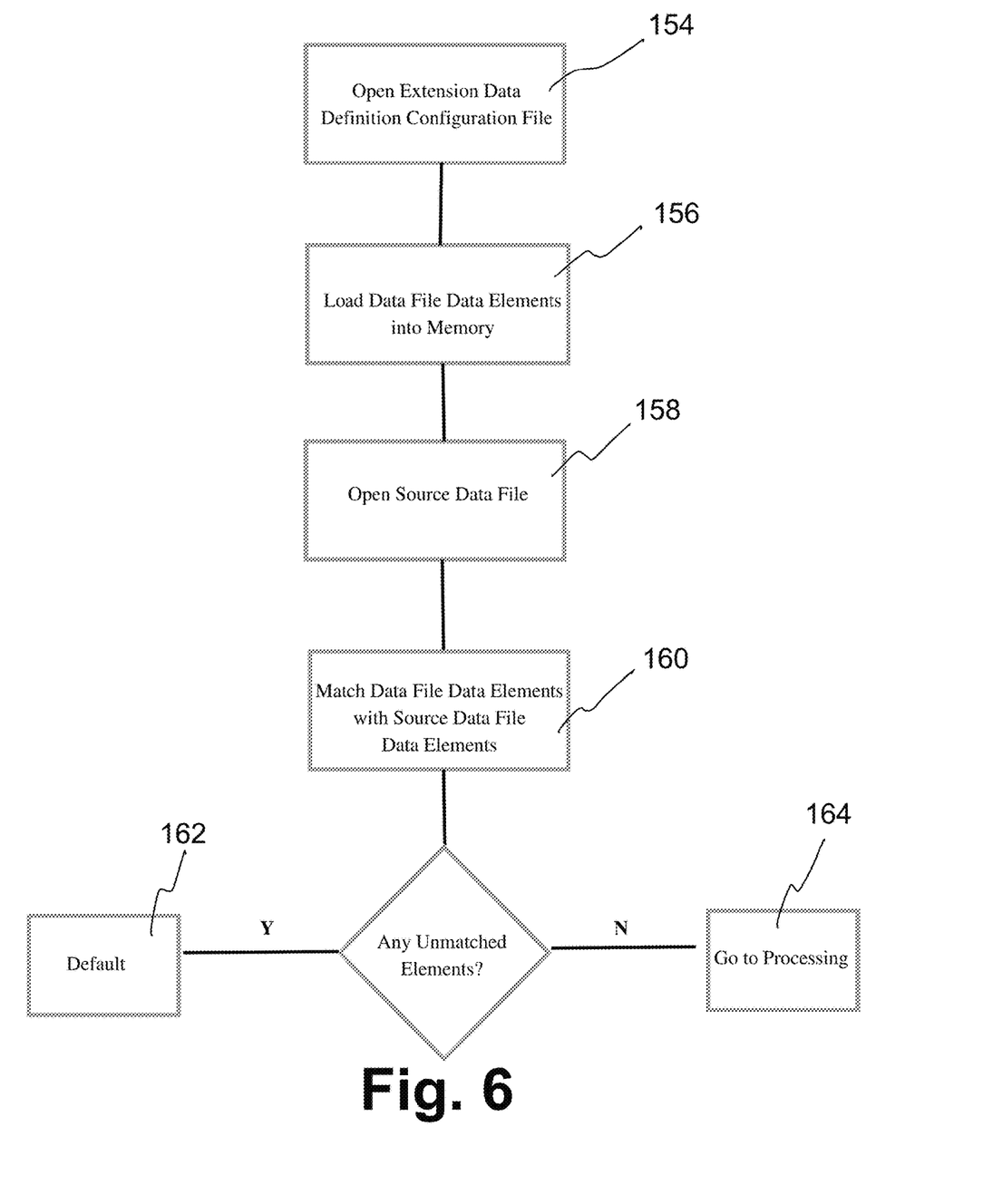
FIG. 6 shows process steps of opening and matching data attributes between a source data file and a data transformation or configuration file, in accordance with embodiments of the present invention.
Figure 7:
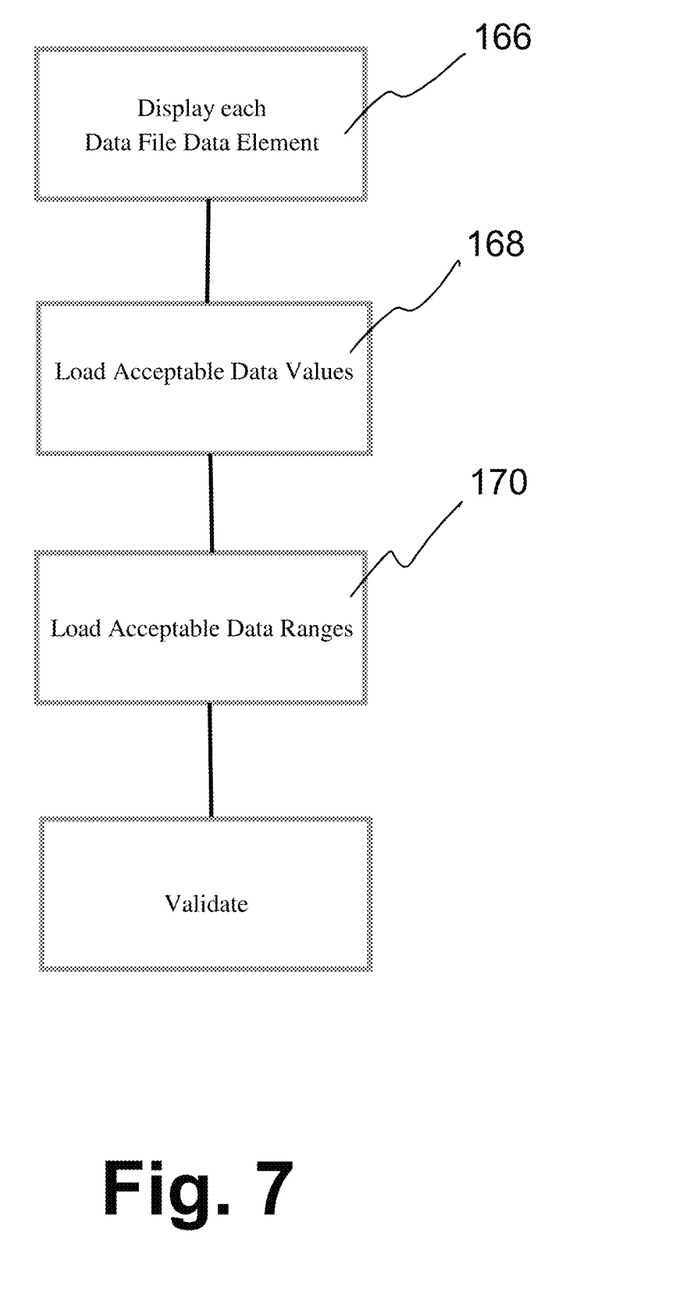
FIG. 7 shows process steps of loading and displaying file attribute values and ranges, in accordance with embodiments of the present invention.

Referring to FIGS. 5-7, embodiments of the present invention consist of the DTEngine and the use of one or more instructional data files (DTFs) to direct the invention to allow the modification of data in the relevant source data file, or the addition of data to the relevant source data file. Each DTF is used to (1) describe or display the contents of each source data file; (2) describe or display what if anything can be modified in each source data file; (3) describe or display the interoperability of the modifiable components of the source data file; and (4) process and provide acceptable values or range of values for the modifiable components within the source data files.

For each source data file that is to be transferred or uploaded, the system 100 will either query (i) a DTF associated with the file extension of that specific source data file to get information about the structure and attributes of that specific source data file; or (ii) an internal data structure associated with the file extension of that specific source data file to get information about the structure and attributes of that source data file. The information about the structure of that specific source data file includes the name and data type of each field in the source data file, certain properties of that field, and any related fields which are associated with each field in the source data file. A myriad of source file attributes can be loaded from, processed, modified, and saved back to the source file, including media file data, buffer data, bit rate data, frame data, compression data, filename data, size data, dates, owner data, permission data, path data, image specifics and specifications, orientation data, signature data, creation and editing data, digital rights data, etc. This listing of attributes is for illustrative purposes only and one of ordinary skill in the art will understand the nearly endless source file attributes available for displaying, modifying, or deleting within a given source file or a given file type.

The source data file is queried at step 150 to determine the file extension type. If found, a specific extension definition configuration file (DTF) is located at step 152 and opened at step 154. If a specific corresponding DTF is not found, a default DTF for the respective file extension type is located and loaded. Next, the DTEngine 140 loads one or more data elements or attributes for the file type into memory of the device 114 at step 156, and the source data file is opened at step 158. The data elements or attributes are matched with the source data file elements or attributes at step 160. It is at this point that the system 100 determines if there are any unmatched elements or attributes. If there are unmatched elements, the DTEngine uses default elements at step 162. If all elements are matched, the system 100 proceeds to processing step 164. During the processing steps 164, as detailed herein, each data element or attribute is displayed (step 166), and acceptable data values (step 168) and data ranges (step 170) are loaded.

The user interface can include one or more menus or selection lists displaying and identifying at least the source file and the DPD attributes. The existing values for the original source file attributes can be displayed, and one or more fields are provided for the user to input data values for those attributes capable or desirable of modification. Again, pull down menus, selectable pre-defined values, and open field data entry options are envisioned for use in displaying and receiving user input for the file attributes.

By way of an example, assume the file extension of a source file that is to be transferred has a file extension of .XYZ. The extension .XYZ is queried at step 150, and a corresponding DTF file is located (step 152) and opened (step 154) by the DTEngine 140. Here, an ExtensionFieldConfig.cfg DTF file can be provided and the DTEngine retrieves all of the field or attribute information associated with the .XYZ file from the respective DTF file. Below is an example of data contained in the DTF associated with the file extension of the specific source data file:

```
<extension field configuration>
    <extensions>
        <extension_id="ABC">
            <fields>
                <field id="ABC00001" >
                    <name>Bit Rate</name>
                    <modify type>calculated</modify type>
                    <first related>Sample Rate</first related>
                    <second related>Bit Depth</second related>
                    <third related>Channels</third related>
                    <four related>none</four related>
                    <fifth related>none</fifth related>
                    <six related>none</six related>
                </field>
                <field id="ABC00002" >
                    <name>Sample Rate</name>
                    <modify type>modifiable</modify type>
                    <first related>none</first related>
                    <second related> none</second related>
                    <third related> none</third related>
                    <four related>none</four related>
                    <fifth related>none</fifth related>
                    <six related>none</six related>
                </field>
                ...
                <field id="XYZ00001" >
                    <name>First Name</name>
                    <modify type>modifiable</modify type>
                    <first related>none</first related>
                    <second related> none</second related>
                    <third related> none</third related>
                    <four related>none</four related>
                    <fifth related>none</fifth related>
                    <six related>none</six related>
                </field>
            </extension>
    </extensions>
</extension field configuration>
```

At this point, the system 100 (e.g., via the DTEngine) will know all of the fields associated with that specific source data file and will be able to cause the contents of the file to be displayed and edited by the user or operator—and determine and indicate whether or not the contents of the source data file, or limited parts thereof, can be modified.

For each field in that specific source data file, the system 100 can now query the instructional DTF to ascertain the acceptable values that field can accept. Specifically, the instructional file will contain acceptable values to change the attribute data from and to, as well as provide a list of known values that the field can accept, and that the user can therefore modify.

As another example, for the below-listed file that has an extension of .ABC, we know that the field Bit Rate has a field or attribute id of ABC00001. The DTEngine can query the FieldConfig.cfg file, and retrieve all the data value information for that specific field or attribute. Below is an example of the data contained in the DTF associated with the fields found in this specific source data file:

```
<field configuration>
    <fields>
        <field id="ABC00001" >
            <list id="ABC00001_List01">
                0001
                0002
                0003
                0004
                0005
            </list>
        </field>
        <field id-"ABC00002">
            <value id="ABC00001_Value">Alphanumeric </value>
        </field>
    </fields>
</field configuration>
```

Other embodiments of the present invention can include a proprietary format with a proprietary file extension—e.g., .SUDF, which could be a file extension acronym for Special Use Dental Format. Within the DTFs, DPDs exist for the file extension as detailed herein. Additionally, the .SUDF file can also serve as an archive file that contains many other files. As the system 100 appears to intercept these subject files, the DPD segment instructs the software to parse a segment of the .SUDF file (or extract XML data from the file) and display relevant data to the user as the .SUDF file is transferring to the destination location.

In doing so, the user has immediate feedback for a given order or editing instructions, and can manipulate attributes of that order while the .SUDF file is being uploaded, transferred or processed. Again, the .SUDF file type is for illustrative purposes only. A myriad of other file types or file types and extensions can be employed without deviating from the spirit and scope of the present invention.

The modified attributes of the source file, or batch of source files, created by the user are cached while the upload process continues. Once the upload is finished, the application automatically updates the attributes for the file or the batch of files now resident on the destination computing system or server. Thus, the user does not need to wait for the upload to complete before the attributes are altered.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

While the methods, steps, and processing described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A simultaneous file upload and source file data value modification system, comprising in combination:
   A. a computing system including at least one server comprising: (i) at least one processor, (ii) at least one computer memory, and (iii) and at least one network interface;
   B. a file upload facility at the at least one server operable to receive a transfer, via a communication network, of one or more modified source data file values of a source data file, simultaneous with the transfer of the source data file;
   C. a data processing and transformation engine comprising:
      (i) a first matching operation identifying one or more matches from a first group consisting of source data file elements and source data file attributes;
      (ii) a second matching operation identifying one or more non-matches from the group consisting of source data file elements and source data file attributes;
      (iii) an application operation applying a default value to the non-match;
      (vi) a write operation writing one or more modified source data file values to the source data file; and
      (v) a caching operation providing temporary storage of one or more modified source data file values;
   D. a validating facility comprising:
      (i) a verification operation verifying validity of modified values; and
      (ii) a permission operation at least partially controlling whether one or more of the matches or non-matches are modifiable; and
   E. a data transformation file comprising one or more data processing definitions, the data processing definition comprising a description of one or more transformation actions:
      (i) modifiable attributes of the source data file;
      ii) modifiable elements of the source data file;
      (iii) permitted attribute value changes;
      (iv) permitted element value changes;
      (v) interrelations between source data file attributes;
      (vi) interrelations between source data file elements;
      (vii) a minimum range value for an attribute;
      (viii) a minimum range value for an element;
      (ix) a maximum range value for an attribute; and
      (x) a maximum range value for an element.

* * * * *